(12) United States Patent
Schroebel et al.

(10) Patent No.: US 8,251,556 B2
(45) Date of Patent: Aug. 28, 2012

(54) REAR ELEMENT FOR A MOTOR VEHICLE COMPRISING A LIGHTING UNIT

(75) Inventors: Sven Schroebel, Darmstadt (DE); Rudolf Blass, Darmstadt (DE); Anton Halblaender, Griesheim (DE)

(73) Assignee: Evonik Roehm GmbH, Darmstadt (DE)

( * ) Notice: Subject to any disclaimer, the term of this patent is extended or adjusted under 35 U.S.C. 154(b) by 0 days.

(21) Appl. No.: 12/669,595

(22) PCT Filed: May 9, 2008

(86) PCT No.: PCT/EP2008/055736
§ 371 (c)(1),
(2), (4) Date: Jan. 19, 2010

(87) PCT Pub. No.: WO2009/013036
PCT Pub. Date: Jan. 29, 2009

(65) Prior Publication Data
US 2010/0208479 A1 Aug. 19, 2010

(30) Foreign Application Priority Data
Jul. 23, 2007 (DE) .................. 10 2007 034 714

(51) Int. Cl.
*B60Q 1/56* (2006.01)
(52) U.S. Cl. .............. 362/497; 362/505; 362/511
(58) Field of Classification Search ........... 362/487, 362/497, 498, 499, 505, 511, 540, 543; 40/204, 40/205, 206, 209
See application file for complete search history.

(56) References Cited

U.S. PATENT DOCUMENTS

| | | | | |
|---|---|---|---|---|
| 1,520,257 | A * | 12/1924 | Morlan et al. | 362/497 |
| 2,025,952 | A * | 12/1935 | Levet | 40/205 |
| 2002/0046517 | A1 | 4/2002 | Kondo et al. | |
| 2003/0128549 | A1 | 7/2003 | Matsuura et al. | |
| 2006/0175735 | A1 | 8/2006 | Hoess et al. | |
| 2007/0006493 | A1 | 1/2007 | Eberwein | |

FOREIGN PATENT DOCUMENTS

| | | |
|---|---|---|
| DE | 1 900 899 | 2/1970 |
| DE | 296 06 333 | 6/1996 |
| DE | 102 58 465 | 7/2003 |
| DE | 103 32 978 | 2/2005 |
| GB | 1199705 | 7/1970 |

(Continued)

OTHER PUBLICATIONS

Office Action issued Oct. 27, 2011, in Japanese Patent Application No. 2010-517332 (German translation only).
Office Action issued Sep. 9, 2011, in Chinese Patent Application No. 200880021338.8 (with English-language translation).

*Primary Examiner* — Y My Quach Lee
(74) *Attorney, Agent, or Firm* — Oblon, Spivak, McClelland, Maier & Neustadt, L.L.P.

(57) ABSTRACT

The present invention relates to a rear-end element (1) for a motor vehicle encompassing an illumination unit (2) for the illumination of a number plate, where the illumination unit (2) illuminates the rear side of the number plate and the illumination unit (2) has a translucent body (3) and an illuminant (4), where the translucent body of the illumination unit (2) has been introduced by way of the side area (5) into the rear-end element (1). The present invention moreover describes a motor vehicle which encompasses a rear-end element described above.

20 Claims, 4 Drawing Sheets

FOREIGN PATENT DOCUMENTS

| | | |
|---|---|---|
| JP | 2000-229544 | 8/2000 |
| JP | 2002-46465 | 2/2002 |
| JP | 2004-177764 | 6/2004 |
| JP | 2004-235103 | 8/2004 |
| JP | 2006-525140 | 11/2006 |
| JP | 2007-504055 | 3/2007 |

* cited by examiner

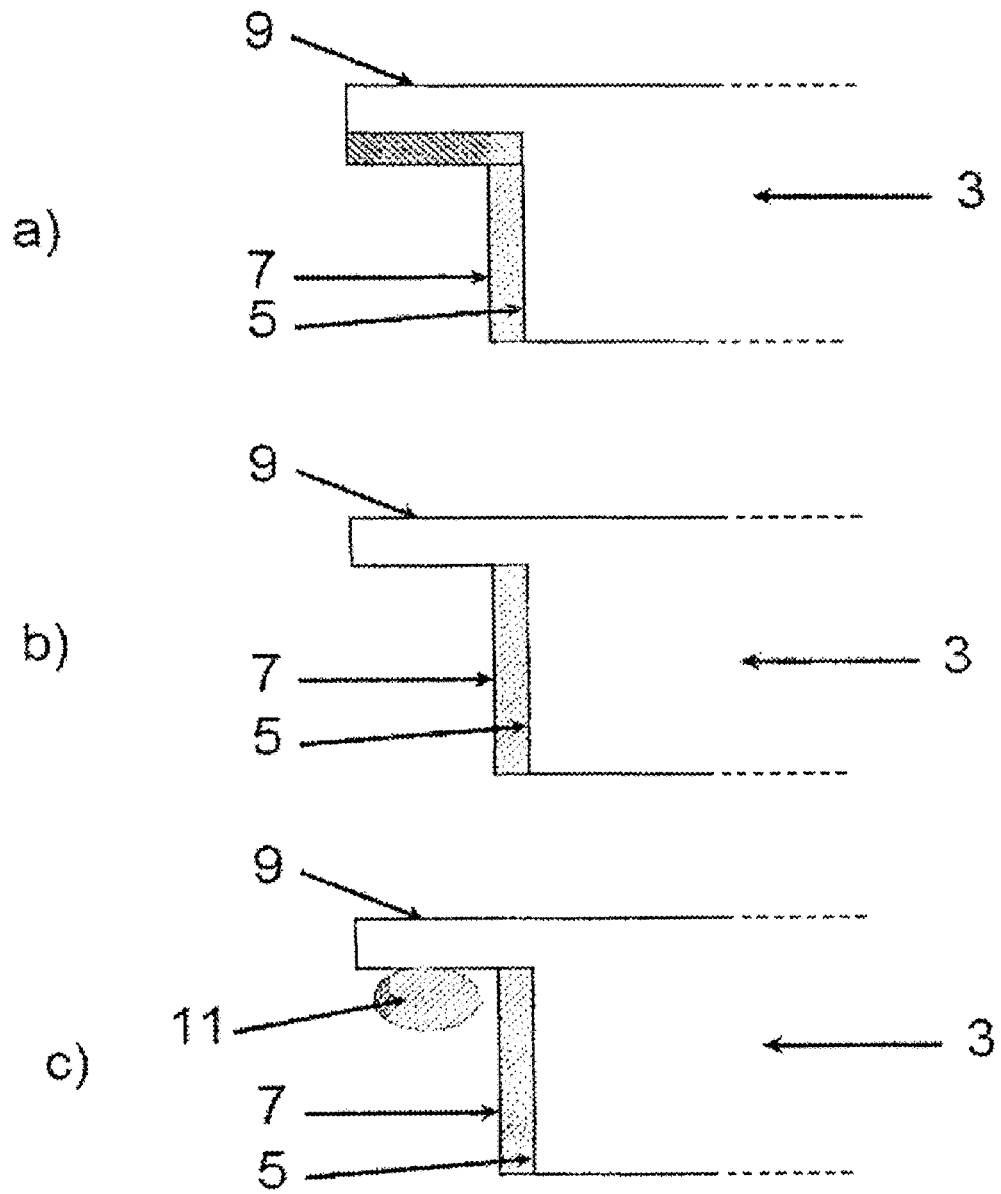

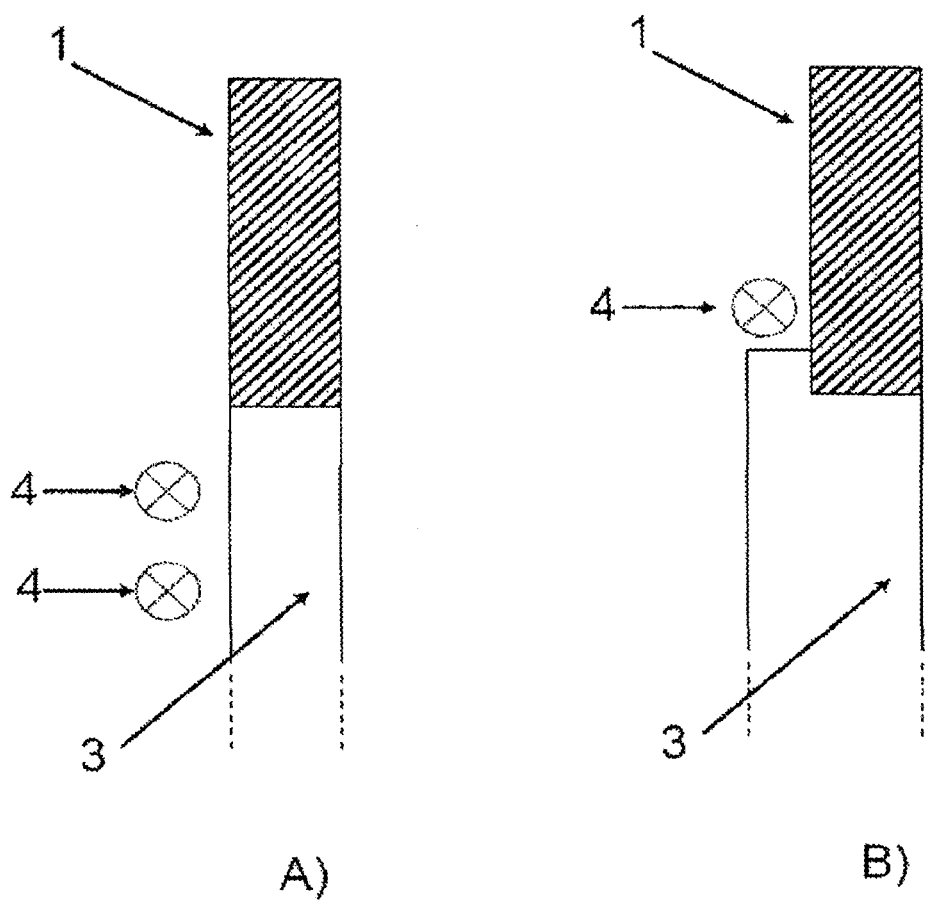

REAR ELEMENT FOR A MOTOR VEHICLE COMPRISING A LIGHTING UNIT

BACKGROUND OF THE INVENTION

The present invention relates to a rear-end element for a motor vehicle encompassing an illumination unit for the illumination of a number plate, where the illumination unit illuminates the rear side of the number plate.

Number plates of motor vehicles are generally illuminated via two or three lamps which have been attached above or below the number plate. However, a disadvantage is that the number plate is not uniformly illuminated. The illuminants attached externally above and below the plate moreover restrict the opportunities for optimizing the design of the vehicle.

There are also known illumination devices which illuminate the number plate via a light source attached at the rear. By way of example, illuminant foils or optically conductive bodies can be used as light source. Embodiments of this type for the illumination of number plates have been described by way of example in the publications WO 2007/012306, EP-A-1 262 373 and EP-A-1 477 368.

According to the publication WO 2007/012306, the optically conductive body can illuminate the number plate from the front, i.e. seen from the side facing away from the vehicle. A disadvantage here, however, is that slight damage to the optically conductive body leads to undesired emission of the light. The legibility of the plate is thus markedly reduced. By way of example, stone impact can cause this type of damage, visible in the form of scratches, and it is therefore impossible to avoid.

The publication EP-A-1 262 373 describes a number plate which is illuminated via an illuminant foil applied at the rear. An arrangement similar to the number plate described in the publication EP-A-1 262 373 is described in the publication EP-A-1 477 368. In this embodiment, an optically conductive body is used for the illumination of the number plate.

The number plates described in the publications EP-A-1 262 373 and EP-A-1 477 368 are attached to a rear-end element, such as a rear flap or a bumper, using conventional fastening devices.

A disadvantage here, however, is that the illumination unit has to be attached to the rear-end element in an additional operation. The illumination element can moreover be easily dismantled from the rear-end element. A factor to be taken into account here is that the illumination units can be retrofitted and these retrofit sets currently achieve a high price.

The use of the illumination equipment described in the publications EP-A-1 262 373 and EP-A-1 477 368 moreover restricts design freedom.

The illumination equipment for number plates described in the publications EP-A-1 262 373 and EP-A-1 477 368 is also complicated in terms of production and installation. There are moreover great restrictions on the selection of the illuminant, and the illuminant foil described in EP-A-1 262 373 is very expensive. EP-A-1 477 368 likewise demands a very specific illuminant, for which very restricted space is available, for high luminous intensity.

SUMMARY OF THE INVENTION

In the light of the prior art, it was now an object of the present invention to provide a rear-end element for a motor vehicle which has an excellent property profile. In particular, the illumination element should not be capable of easy dismantling from the rear-end element. The illumination element should moreover have minimum effect on the design of the rear-end element, in order to give the designers wide scope for design of the motor vehicle.

Another object of the invention consisted in providing a rear-end element for a motor vehicle with an illumination unit, where the rear-end element can be produced quickly and with particular ease. It should be possible here to obtain the rear-end element at particularly low cost.

Another object of the present invention was to provide a rear-end element of the type described above whose illuminant can be selected freely.

A rear-end element for a motor vehicle with an illumination unit with all of the features of Patent Claim 1 achieves these objects, and also achieves other objects which, although not explicitly mentioned, are readily derivable or deducible from the circumstances discussed in the introduction. Advantageous embodiments of the inventive rear-end element are protected by the dependent claims which refer back to Claim 1.

The present invention accordingly provides a rear-end element for a motor vehicle encompassing an illumination unit for the illumination of a number plate, where the illumination unit illuminates the rear side of the number plate and the illumination unit has a translucent body and an illuminant, characterized in that the translucent body of the illumination unit has been introduced by way of the side areas into the rear-end element.

The result is to provide, in a manner which was not foreseeable, a rear-end element for a motor vehicle which has the excellent properties described above. Surprisingly, the inventive measures can produce a rear-end element encompassing an illumination unit for the illumination of a number plate, where the illumination element cannot be dismantled from the rear-end element. Particular advantage here, not readily foreseeable, is that an illumination unit for the illumination of a number plate has very little effect on the design of the rear-end element. The designers can thus design the rear-end part of the vehicle in many different ways.

The inventive measures moreover provide a rear-element for a motor vehicle with an illumination unit, where the rear-end element can be produced quickly and with particular ease. The rear-end element can therefore be obtained at particularly low cost. In this connection, a particular factor to be taken into account is the saving in materials, which represents a surprising and advantageous element of the present invention when raw materials are in short supply and a saving in weight contributes to a reduction in fuel consumption.

The illuminant for the illumination of the number plate can moreover be selected freely, and conventional incandescent lamps can also be used here. The fact that there is no particular restriction on the overall depth of the illumination unit is a particular factor leading to this particular advantage.

The present invention in particular provides a rear-end element for a motor vehicle. The expression "rear-end element" describes in particular a component of the rear end of motor vehicles which contributes to the design. Among these are in particular the rear flap and also the bumper of the vehicle or a rear spoiler attached to the vehicle. Accordingly, this expression serves in particular for delimitation with respect to conventional fastening elements which are used by way of example as retainer for conventional number plates.

These rear-end elements can by way of example be produced from metal, in particular steel, and/or plastic. Among the preferred plastics for the production of the rear-end element are inter alia polyolefins, in particular polyethylene, polypropylene or cycloolefin copolymer; polyacetals, in particular polyoxymethylene; polyamide; polyphethylene oxide; polyphenylene sulphide; polyphenylene ether; polyurethane; polycarbonate; polyester, in particular polyethylene terephthalate or polybutylene terephthalate; polystyrene; poly(meth)acrylates, in particular polymethyl methacrylate (PMMA), acrylonitrile-butadiene-styrene copolymers or acrylonitrile-styrene-acrylate graft polymers, where these plastics may have been rendered impact-resistant.

The inventive rear-end element encompasses an illumination unit for the illumination of a number plate, where the illumination unit illuminates the rear side of the number plate and the illumination unit has a translucent body. The translucent body of the illumination unit has been introduced by way of the side areas into the rear-end element. The expression "side area" here indicates the area which forms the boundary of the translucent body perpendicularly with respect to the frontal side or rear side. The side area is generally generated by the thickness of the translucent body of the illumination unit and also by the peripheral length of the frontal side or of the reverse side of the translucent body. If, by way of example, an illumination unit in the form of a panel is used, two of the side areas are generated from the product of the thickness of the panel and the length of the panel, and two of the side areas are generated from the product of the thickness of the panel and the width of the panel. The smallest linear dimension of the illumination unit represents the thickness. The area of the frontal side is generated by that area of the translucent body that can be used for the illumination of the number plate. The rear side of the translucent body is the term used for the area oriented towards the interior of the vehicle. The peripheral length of the translucent body is generated by way of example in the case of a panel from the sum of twice the length of the body and twice the width of the body.

From the descriptions above it is apparent that an inventive rear-end element has at least one further construction element, which by way of example can have been painted, and which has been produced with a recess into which the translucent body of the illumination unit has been fitted. Rear-end elements according to the prior art do not have this type of recess.

The translucent body of the illumination element can by way of example have been introduced into the rear-end element in such a way as to be held by frictional forces, by interlocking (e.g. via mechanical fastening elements) or by cohesion (e.g. adhesive bonding or via injection moulding).

Among the mechanical fastening elements which can be used for the introduction of the translucent body into the rear-end element are by way of example snap hooks, screw threads and snap closures.

One preferred variant for the introduction of the translucent body into the rear-end element is adhesive bonding. Adhesive bonding is a particularly low-cost jointing method which is particularly suitable for the bonding of two components in a mass-production process and moreover has many advantages over other known jointing methods, these being well known to the person skilled in the art and reference thereto at this point therefore requiring no further discussion.

It has proven to be particularly advantageous to adhesive-bond the translucent body into the rear-end element by means of one or more adhesive areas between the side areas of the translucent body, or a projection provided on the side areas, and that component of the rear-end element that surrounds the translucent body, and the adhesive area here can take the form of, for example, peripheral, coherent line of adhesive or, respectively, area of adhesive, or else can be composed of adhesive areas separate from one another. Another possibility is to use spot adhesive-bonding by means of a sequence or series of adhesive spots or adhesive areas, and this is likewise proposed.

The adhesive areas of the translucent body and, respectively, of the rear-end element here can be butt-jointed with respect to one another or can overlap one another. However, the translucent body can also be pressed or pushed into a seal or guide designed on the corresponding component of the rear-end element and be adhesive-bonded thereto in such a way that the translucent body has thus been bonded securely to the corresponding components of the rear-end element.

The translucent body can moreover advantageously be introduced by injection moulding into the rear-end element. If the other constituents of the rear-end element have likewise been manufactured from plastic, it is particularly economic and advantageous to use the multicomponent injection-moulding process, where, by way of example, the component surrounding the translucent body is first moulded in the injection mould, i.e. is pre-injection-moulded, and the translucent body is then injection-moulded into the resultant moulding.

The production method used here can by way of example be the insert or transfer method. In this method, the component surrounding the translucent body is first injection-moulded and demoulded. In a second, separate downstream injection-moulding step, this pre-moulding is then inserted or transferred into another mould with a recessed cavity, and the plastic forming the translucent body is injected into the mould and thus injection-moulded into or onto the pre-moulding. With respect to the adhesion subsequently achievable, it is particularly advantageous if the pre-moulded injection moulding is preheated, thus facilitating insipient melting of the surface by the over-moulded component and penetration thereof into the boundary layer. The temperature of the pre-moulded injection moulding here can be raised to just below the melting point, which can be determined to ISO 3146 Method C 1b.

It is also possible, however, that the pre-moulded injection moulding is only partially demoulded and is moved, together with a part of the original mould (e.g. the feed plate, the ejector half, or just one indexing plate) into another larger cavity.

Another possibility consists in injecting the component forming the translucent body into the same mould without intermediate opening of the machine and onward transport of the pre-moulding (2-component injection moulding). Here, the mould cavities intended for the component forming the translucent body are initially sealed via displaceable inserts or cores during injection of the first component and are not opened until the second component is injected (slide technique). This variant of the process is also particularly advantageous for achieving good adhesion, since the melt of the second component encounters a pre-moulding which is still hot, after only a short cooling time.

For improvement of the stability of the bond between the translucent body and the rear-end element, the side areas of the illumination unit can have a projection. Accordingly, by way of example, the reverse side of the translucent body can take up a larger area than the frontal side of the translucent body. The projection can by way of example serve for bonding of the translucent body to the rear-end element by a screw thread or by adhesion. Light can moreover be passed by way of the projection into the translucent body, thus permitting particularly easy access to the illuminant.

According to an advantageous embodiment of the present invention, there may be a gasket provided between the side areas of the translucent body of the illumination unit and the rear-end element. This can reliably prevent penetration of water into the interior of the vehicle. The gasket can, as a function of the manner of fastening of the translucent body to the rear-end element, be introduced into the bond purely via injection moulding or mechanically. Gaskets can in particular be obtained from thermoplastic elastomers, which can preferably be applied via injection moulding to the translucent body or to the rear-end element. Among these are in particular straight or modified polyolefin elastomers (TPEO), in particular polypropylene elastomers, such as ethylene/propylene tertpolymer/propylene (PPEPDM), crosslinked ethylene/propylene terpolymer/propylene (PPX/EPDM), nitrile-butadiene rubber/polypropylene (PPNBR); crosslinked polyolefin elastomers (TPEV); elastomers based on polyetherester or polyesterester (TPEE), polyetherurethane elastomer and/or polyesterurethane elastomer (TPEU); polyetheramide elastomer (TPEA) and/or styrene elastomer (TPES), and in particular styrene-butadiene-styrene copolymers (SBS), styrene-ethylene-butylene-styrene copolymers (SEBS), styrene-ethylene-propylene-styrene copolymers (SEPS), and styrene-isoprene-styrene copolymers (SIS).

The inventive illumination unit to be used encompasses a translucent body. The expression "translucent" means that light can pass through the body in order to illuminate the number plate. According to one preferred embodiment, the transmittance of the translucent moulding is preferably from 20% to 92%, preferably from 80% to 92%, with no intended resultant restriction. The transmittance can be determined to DIN 5036.

Among the suitable translucent bodies are in particular optically conductive bodies and also plastics bodies designed with diffusing properties.

Optically conductive bodies have at least one area for light input and at least one area for light output. The emission area for output of light here characterizes an area of the optically conductive body which is suitable for emitting light. Among these are in particular here the frontal side of the optically conductive body, this being the side facing away from the vehicle and the side which illuminates the number plate from the rear side. The area for light input in turn is capable of accepting light into the body so that the optically conductive layer can distribute the input light across the entire area for light output. Light input here particularly takes place by way of the side areas of the optically conductive body. The thickness of the optically conductive layer is preferably at least 1 mm, particularly preferably at least 2 mm. Emission of the light can by way of example be achieved via structuring of the area for light output or via scattering particles, for example barium sulphate, titanium dioxide or organic scattering beads, for example based on crosslinked styrene particles, which are present in the optically conductive body, so that light output occurs across the entire surface for light output. Particularly preferred organic scattering beads are inter alia obtainable from Sekisui with trademark ®Techpolymer SBX-8 and ®Techpolymer SBX-12.

The ratio of area for light output to area for light input here can be at least 2, preferably at least 10 and particularly preferably at least 20.

The light is generally emitted approximately perpendicularly to the direction of propagation of light, and the amount of light emitted here depends on the amount of scattering particles in the plastics matrix and, respectively, the extent of surface structuring. The greater this amount, the greater the amount of light emitted. The amount is therefore dependent on the size of the area for light output. As the dimension of the optically conductive body perpendicularly to the area for light input increases, the selected amount of scattering particles in the optically conductive layer decreases.

The optically conductive body is preferably produced from a transparent plastic. Among the transparent plastics are in particular polycarbonates, polymethyl methacrylates, polybutyrates, polystyrenes, in particular syndiotactic polystyrene copolymers.

Plastics of particular interest are those which preferably encompass from 0.0001% by weight to 2% by weight, particularly preferably from 0.0005% by weight to 1% by weight, of scattering particles.

Suitable optically conductive bodies can be obtained commercially by way of example from Rohm GmbH with trademark Plexiglas® EndLighten.

The optically conductive body preferably has excellent mechanical and thermal properties. These properties encompass in particular a Vicat softening point to ISO 306 (B50) which is preferably at least 85° C., notched impact resistance NIR (Izod 180/1eA, 1.8 MPa) to ISO 180 which is preferably at least 2.0 kJ/m$^2$ at 20° C., and modulus of elasticity to ISO 527-2 which is preferably at least 1500 MPa. The transmittance of the optically conductive body is preferably in the range from 80% to 92%, preferably from 85% to 92%.

The size of the optically conductive body is not subject to any particular restriction, but the area can preferably correspond approximately to that area of the number plate to be illuminated, since smaller optically conductive bodies can lead to poor illumination of the number plate, while in contrast relatively large optically conductive bodies lead to higher costs, but with no attendant additional advantages. The thickness of the optically conductive body is often dependent on the specific technique used to illuminate the optically conductive body. Optically conductive bodies of particular interest can in particular be those whose thickness is in the range from 1 mm to 2 cm, particularly preferably from 2 mm to 1 cm.

Translucent bodies which are of particular interest, furthermore, are those formed via a plastics body designed with diffusing properties. These plastics bodies are likewise preferably formed via a transparent plastic, and these have been described above by way of example. The plastics body designed with diffusing properties particularly preferably encompasses at least 50% by weight of PMMA. Light is irradiated by way of the rear side into this plastics body designed with diffusing properties, and the light source here can preferably not be discerned from the frontal side. This property can be achieved via scattering particles, and the proportion of scattering particles in the plastic here is preferably in the range from 0.5% by weight to 20% by weight, particularly preferably in the range from 1% by weight to 12% by weight. Preferred scattering particles have been described above, and in this connection it is preferable to use organic scattering particles.

The plastics body designed with diffusing properties preferably has excellent mechanical and thermal properties. These properties in particular encompass a Vicat softening point to ISO 306 (B50) which is preferably at least 85° C., a Charpy impact resistance to ISO 179 which is preferably at least 15 kJ/m$^2$ at 23° C., and a tensile modulus of elasticity to ISO 527-2 (1 mm/min) which is preferably at least 1700 MPa. The transmittance of the diffusely designed plastic body is preferably in the range from 75% to 92%, preferably from 80% to 90%.

Plastics suitable for the production of the plastics body designed with diffusing properties can be obtained commercially, for example from Rohm GmbH with the trademark Plexiglas® df22 7N, df23 7N, df22 7H, df23 7H, df21 8N, df22 8N, df23 8N, df22 zk6BR and df23 zk6BR.

Alongside the translucent body, the illumination unit has at least one illuminant. Among the suitable illuminants are by way of example incandescent lamps, light-emitting diodes or illuminant foils. The luminance of the illuminants is preferably from 0.1 to 100 candela per square meter, particularly preferably from 1 to 30 candela per square meter.

Embodiments of the inventive rear-end element which are of particular interest are particularly those which encompass at least two illuminants which produce different colours on the number plate. This method can by way of example be used to warn the following traffic of dangers. According to this embodiment, therefore, red or orange light can preferably be produced, as well as white or yellow light.

The illumination unit can moreover encompass other components, examples being a housing which seals the translucent body and also the illuminant with respect to the interior of the vehicle.

The number plate can be attached by any known manner on top of the translucent body of the illumination unit. By way of example, the rear-end element can have a frame for the fastening of a number plate. This frame can by way of example be produced on the rear-end element via injection moulding. The frame can moreover be applied by adhesive bonding to the rear-end element. The number plate can particularly advantageously be bonded to the rear-end element via adhesive bonding.

The present invention also provides a motor vehicle which encompasses an inventive rear-end element. In particular, motor vehicles which have a number plate which was applied by adhesive bonding to the illumination element are of particular interest.

Particularly suitable number plates encompass, alongside an adhesive layer, at least one translucent, retroreflective layer. Layers of this type are permeable to light incident on the rear side, whereas they reflect light incident on their frontal side. In order to exhibit these properties, these layers can by way of example have scattering bodies, an example being silvered glass hemispheres, or can have structures. The nature of the material from which these layers are produced is not per se critical, but transparent plastics are preferred here, these having been described above by way of example.

Retroreflective foils and, respectively, layers which can encompass structures, for example prisms or cube-corner patterns, are described inter alia in U.S. Pat. Nos. 4,588,258, 5,122,902, WO 98/20375 and DE 699 04 512. The publication U.S. Pat. No. 4,005,538 describes foils equipped with scattering bodies.

These layers can in particular be obtained in the form of foils with trademark Scotchlite® from 3M.

BRIEF DESCRIPTION OF THE DRAWINGS

The present invention is described below using FIGS. 1 to 6, but with no intention of any resultant restriction of the invention.

FIG. 5 is a diagrammatic cross section of the translucent body with a projection and FIG. 6 shows two variants of the illumination of the translucent body, where the position of the illuminant has been shown diagrammatically.

DETAILED DESCRIPTION OF THE INVENTION

Figure 1:
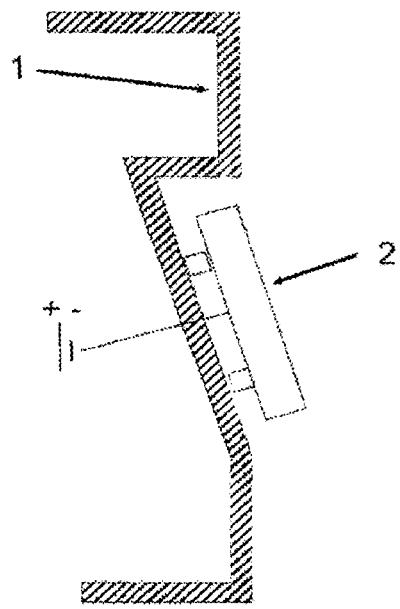
FIG. 1 here is a diagrammatic cross section of a rear-end element according to the prior art.

FIG. 1 is a diagrammatic cross section of a rear-end element (1) which here is a rear flap of the prior art. The illumination unit (2) of the number plate here is applied to the rear flap, and this is therefore not an integral unit of the rear flap, but has to be considered to be an add-on part.

Figure 2:
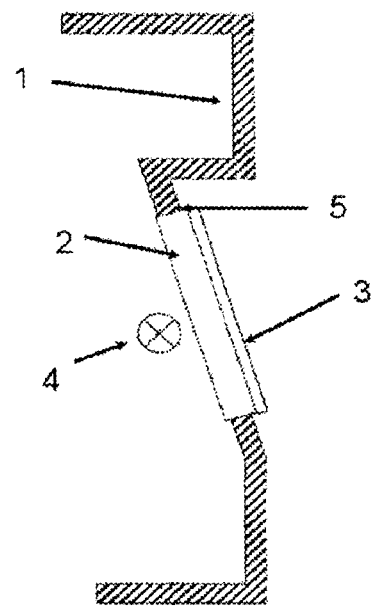
FIG. 2 is a diagrammatic cross section of an inventive rear-end element.

In contrast to this, FIG. 2 describes a rear-end element (1) which here is a rear flap according to the present invention. The illumination unit (2), which encompasses a translucent body (3) and also an illuminant (4), forms an integral constituent of the rear-end element (1). The translucent body (3) here is introduced by way of the side areas (5) into the rear flap.

Figure 3:
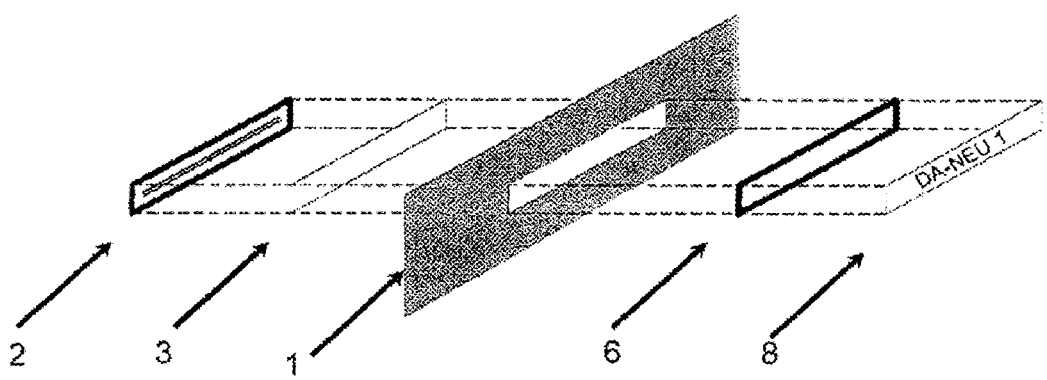
FIG. 3 is an exploded perspective view of a rear-end element with an illumination unit and also a number plate.

To illustrate this structure, FIG. 3 shows an exploded perspective view of a rear-end element (1), which here is a rear flap, with an illumination unit (2). The present embodiment of the rear flap (1) encompasses a component into which the translucent body (3) is introduced. This component can be interpreted as a frame for the translucent body. On the rear side, i.e. oriented towards the interior of the vehicle, there can be a housing for the illumination unit (2), and the illuminant is introduced into this housing. The rear flap (1) can have a frame (6) on the frontal side for the fastening of a number plate (8).

Figure 4:
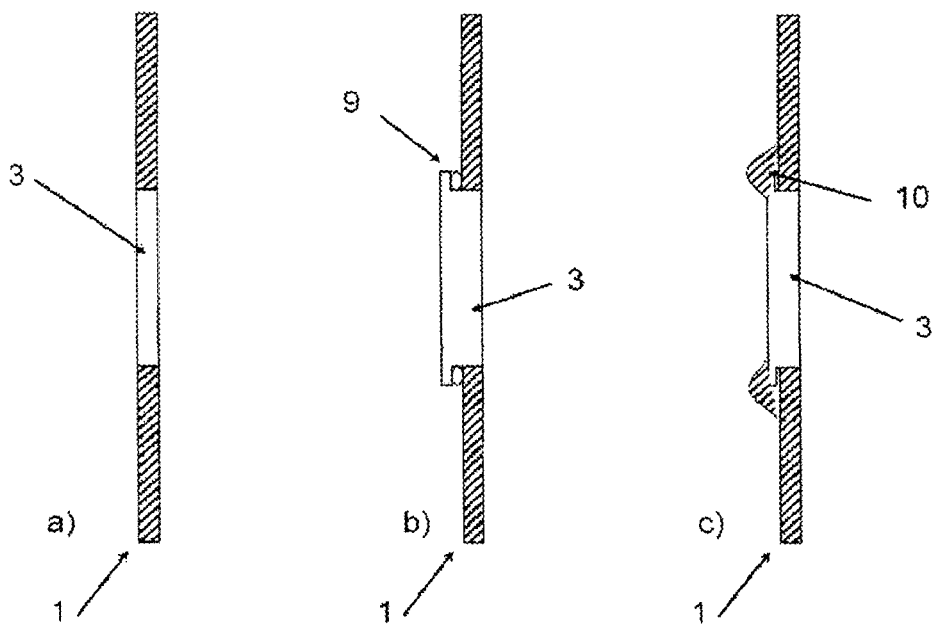
FIG. 4 is a diagrammatic cross section of the bonding of the translucent body to the rear-end element.

FIG. 4 shows various embodiments of the introduction of the translucent body (3) into the rear-end element (1). According to FIG. 4a, the manner of introduction of the translucent body into the rear-end element can be such that it is held by frictional forces. Adhesive bonding of the translucent body (3) can also take place, in order to bond this securely into the rear-end element (1), as shown in FIG. 4b. For this, the translucent body (3) can by way of example preferably have a protrusion (9) in the side areas (5). In this embodiment, the adhesion site is between the rear side of the frame-like component of the rear-end element and the frontal side of the protrusion (9). This is shown in more detail in an enlarged view in the following FIG. 5c. FIG. 4c in particular shows an embodiment in which the translucent body (3) has been introduced into the rear-end element (1) via snap hooks (10).

FIGS. 5a to 5c are diagrammatic cross sections of the translucent body (3) with a protrusion (9), where each of the side areas (5) of the translucent bodies (3) has gasket (7), which in the present embodiment was applied via injection moulding of a thermoplastic elastomer. The gasket here can cover the surface of the protrusion (9) entirely, as described in FIG. 5a. The gasket (7) can moreover cover merely the side areas of the protrusion (9), as described in FIG. 5b. In one particularly advantageous embodiment, a gasket (7) can cover the side areas of the protrusion (9), and adhesive (11) can be applied here on the frontal side of the protrusion (9) for introduction of the translucent body (3) into the rear-end element (1).

FIG. 6 describes two variants of illumination of the translucent body, and the position of the illuminant has been shown diagrammatically here. By way of example, FIG. 6A shows an embodiment in which the light is irradiated by illuminants (4) from the rear side into the translucent body. In the embodiment shown in FIG. 6B, the light is input by way of the side area of the translucent body (3).

The invention claimed is:

1. A rear-end element for a motor vehicle comprising an illumination unit for illuminating a rear side of a number plate, the illumination unit comprising:
    a translucent body; and
    an illuminant;
    wherein:
    the translucent body of the illumination unit has been introduced by way of side areas into the rear-end element;
    the translucent body exhibits a transmittance to light of from 20 to 92%;
    the rear-end element is a rear flap, bumper, or spoiler; and
    the translucent body of the illumination unit is:
        an optically conductive body into which light is irradiated by way of the side areas; or
        a plastic body designed with diffusing properties into which light is irradiated by way of a rear side.

2. The rear-end element according to claim 1, wherein the rear-end element has been manufactured from plastic.

3. The rear-end element according to claim 1, wherein the rear-end element is a rear flap.

4. The rear-end element according to claim 1, wherein:
    the translucent body of the illumination unit is the optically conductive body into which light is irradiated by way of the side areas; and
    the optically conductive body has been produced from a plastic comprising a scattering particle.

5. The rear-end element according to claim 4, wherein the plastic from which the optically active body has been produced comprises from 0.0001 to 2% by weight of the scattering particle.

6. The rear-end element according to claim 1, wherein:
    the translucent body of the illumination unit is the plastic body designed with diffusing properties into which light is irradiated by way of the rear side; and
    the plastic designed with diffusing properties comprises from 0.5% by weight to 20% by weight of a scattering particle.

7. The rear-end element according to claim 1, wherein the translucent body of the illumination unit has been introduced into the rear-end element in such a way that the translucent body is held by frictional forces.

8. The rear-end element according to claim 1, wherein the translucent body of the illumination unit has been introduced into the rear-end element via mechanical fastening elements.

9. The rear-end element according to claim 1, wherein the translucent body of the illumination unit has been introduced into the rear-end element via adhesive bonding.

10. The rear-end element according to claim 1, wherein the translucent body of the illumination unit has been introduced into the rear-end element via injection molding.

11. The rear-end element according to claim 10, wherein the translucent body of the illumination unit has been introduced into the rear-end element via insert or conversion methods or via two-component injection molding.

12. The rear-end element according to claim 1, wherein the rear-end element has a frame for the fastening of the number plate.

13. The rear-end element according to claim 12, wherein the frame for the fastening of the number plate has been bonded to the rear-end element via adhesive bonding.

14. The rear-end element according to claim 12, wherein the frame for the fastening of the number plate was produced on the rear-end element via injection molding.

15. The rear-end element according to claim 1, wherein the side areas of the translucent body of the illumination unit are at least to some extent in contact with a gasket.

16. The rear-end element according to claim 15, wherein the gasket is produced by injection molding.

17. The rear-end element according to claim 1, wherein the illumination unit encompasses at least two illuminants which produce different colors on the number plate.

18. A motor vehicle comprising the rear-end element according to claim 1.

19. The motor vehicle according to claim 18, wherein the motor vehicle comprises a number plate which was adhesive-bonded to the illumination unit.

20. The motor vehicle according to claim 18, wherein the motor vehicle comprises a number plate which comprises a translucent, retroreflective layer.

* * * * *

UNITED STATES PATENT AND TRADEMARK OFFICE
CERTIFICATE OF CORRECTION

| | | |
|---|---|---|
| PATENT NO. | : 8,251,556 B2 | Page 1 of 1 |
| APPLICATION NO. | : 12/669595 | |
| DATED | : August 28, 2012 | |
| INVENTOR(S) | : Sven Schroebel et al. | |

It is certified that error appears in the above-identified patent and that said Letters Patent is hereby corrected as shown below:

On the title page, Item (30), the second Foreign Application Priority Data has been omitted. Item (30) should read:

--(30)    Foreign Application Priority Data

Jul. 23, 2007    (DE).................. 10 2007 034 714.8
Aug. 01, 2007    (DE).................. 10 2007 036 468.9--

Signed and Sealed this
Twentieth Day of November, 2012

David J. Kappos
*Director of the United States Patent and Trademark Office*